July 27, 1948.  J. C. KEYWORTH  2,445,854
FLOW METER

Filed July 5, 1943  3 Sheets-Sheet 1

INVENTOR
JAMES C. KEYWORTH
BY
M. W. McConkey
ATTORNEY

July 27, 1948.　　　　　J. C. KEYWORTH　　　　　2,445,854
FLOW METER

Filed July 5, 1943　　　　　　　　　　　　　　　3 Sheets-Sheet 2

INVENTOR
JAMES C. KEYWORTH
BY
M. W. McConkey
ATTORNEY

July 27, 1948.  J. C. KEYWORTH  2,445,854
FLOW METER
Filed July 5, 1943  3 Sheets-Sheet 3
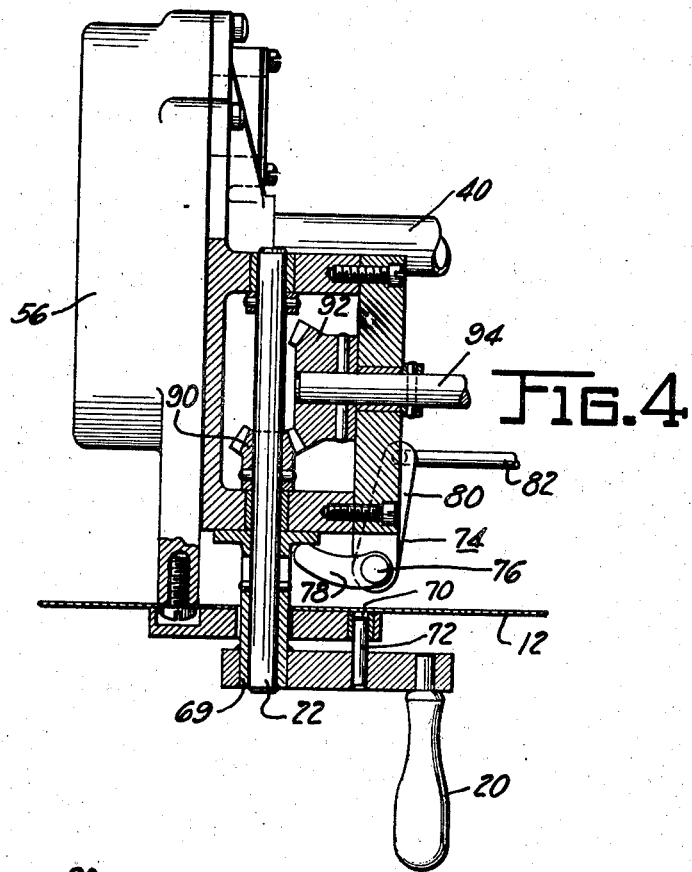
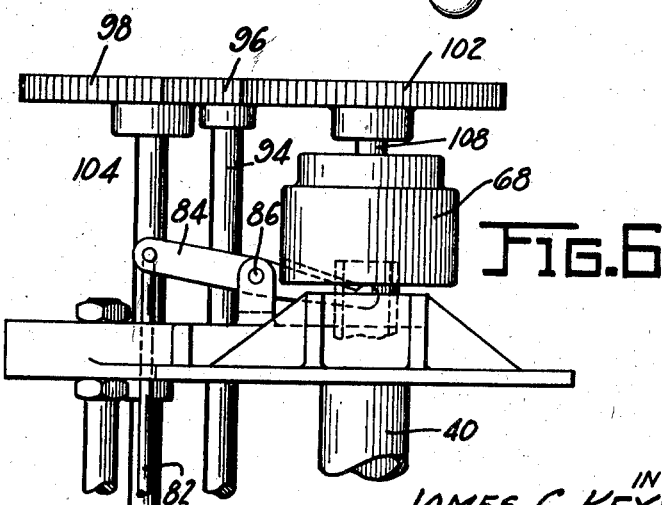
INVENTOR
JAMES C. KEYWORTH
BY M. W. McConkey
ATTORNEY Patented July 27, 1948

2,445,854

UNITED STATES PATENT OFFICE 2,445,854

FLOW METER

James C. Keyworth, South Bend, Ind., assignor to Bendix Aviation Corporation, South Bend, Ind., a corporation of Delaware Application July 5, 1943, Serial No. 493,573

13 Claims. (Cl. 73—216)

1

This invention relates generally to flow meters, and particularly to flow meters of the type which may be adaptable to measuring the flow of fuel supplied to a charge forming device for an internal combustion engine.

As is known to those skilled in the art, a convenient method of measuring the flow of fluid supplied to a charge forming device, for example, consists in inserting a venturi or an orifice in the line supplying said fluid, measuring the difference in the pressures on each side of said orifice or at the entrance or exit and throat of the venturi, calibrating a scale in terms of unit flow of the orifice or venturi to measure the pressure differential across said orifice or venturi, and thereby ascertaining the amount of flow through the orifice or venturi. Since the amount of fluid, such for example as gasoline, supplied to a charge forming device varies between wide limits, depending upon the demands of the internal combustion engine, it is desirable to have a device which is adaptable to all conditions of demand, and which will throughout the range of demand furnish an accurate measurement of the fuel supply. It is obvious that a single size orifice is not readily adaptable to all conditions of fluid flow, since an orifice small enough to produce at low flows a differential pressure sufficient in amount to be accurately measured, will be too small to accommodate the high rates of fuel flow. Conversely, the use of an orifice sufficiently large to accommodate the large fuel demands, will give almost no measurable difference in pressure across the orifice under conditions of low fuel demand. For this reason it is advantageous to provide a plurality of orifices of different sizes, each particularly adapted to measure the flow through a particular portion of the range. A desirable feature, therefore, in such a multiple orifice flow meter lies in the ability to change quickly to the size of orifice desired for a particular fuel demand and to change simultaneously the pressure differential gage or scale used therewith with comparative ease and rapidity, each gage or scale being calibrated for its corresponding orifice to indicate directly the rate of fuel flow.

With the foregoing problems in mind, it is an object of this invention to provide a flow meter for measuring the amount of fuel supplied to a charge forming device which will be accurate in operation regardless of the fuel supplied to said charge forming device.

Another object is to provide a flow meter employing different sized orifices for measuring the

2 fluid supplied to a charge forming or other type of device.

Yet another object is to provide a flow meter having a plurality of metering elements and corresponding gages or scales from which any given element and its corresponding differential pressure gage or calibrated scale may be rapidly selected to measure the amount of fuel supplied to a charge forming device, each gage or scale being calibrated to read directly in units of rate of fuel flow.

A still further object is to provide a flow meter which will be compact in arrangement, and simple to operate.

Yet another object comprehends the provision of novel sealing means in a flow meter which will insure that no leakage occurs around the measuring orifice or element, which might introduce error and disturb the pressure differential to be measured by the gage.

A still further object is to provide a flow meter which is readily adjustable according to the demands for fuel made by the charge forming device.

A still further object comprehends the provision of a novel construction for holding the measuring orifice firmly against the seat, at the same time permitting the orifice to be removed readily from the seat when another size orifice is desired for use.

Another object of the invention is to provide means for insuring that the orifice is in proper position before being brought against its seat, thereby insuring against damage to the parts of the flow meter.

It is a further object of the invention to provide a flow meter particularly adapted for measuring volatile fluids, the meter being so constructed and arranged as to provide a normal path for fluid flow which is substantially without horizontal passages in which vapor might collect.

A further object of the invention is to provide a flow meter of the type where the liquid supplied to the measuring orifice is kept at a constant head, and is prevented from agitation to avoid the possibility of disturbing the pressure differential existing across the measuring orifice.

Other objects of the invention will be apparent from a study of the description and drawings forming a part of this specification, but it is to be understood that the scope of the invention is not limited to the embodiment shown, which is for purpose of illustration only, nor otherwise than by the terms of the claims which are hereto appended.

In the drawings which are employed merely for the purpose of illustrating a preferred embodiment of the invention:

Figure 4 is a view in section taken along the lines 4—4 of Figure 2;

Figure 5 is a view in section taken along the lines 5—5 in Figure 3; and

Figure 6 is a view looking from the right toward the left at the top of the flow meter as shown in Figure 3.

Figure 1:
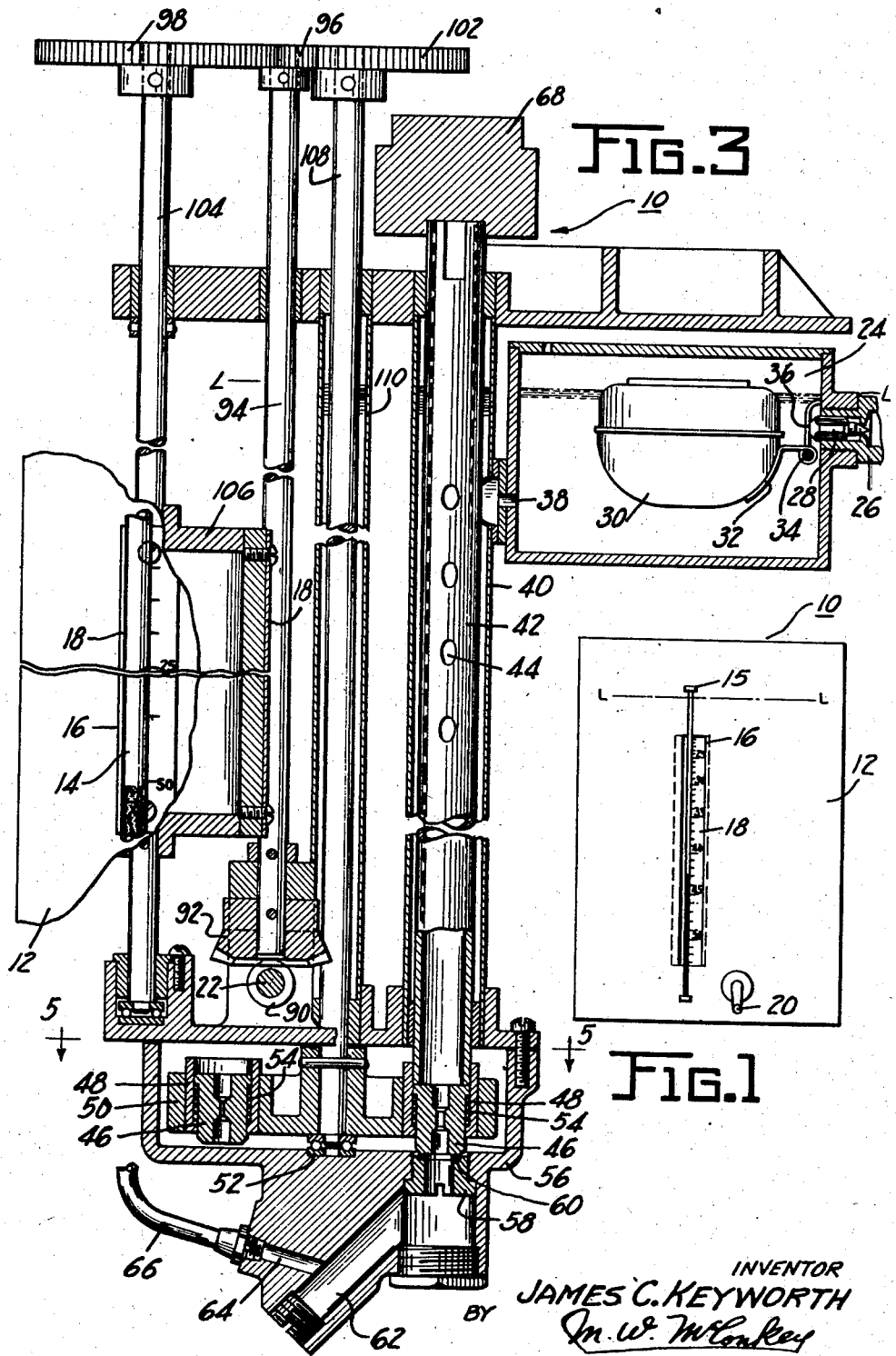
Figure 1 is a front elevation view of the flow meter forming this invention.

Referring now to Figure 1 of the drawings, there is shown a front elevation view of the flow meter indicated generally by the ordinal 10, which comprises a front panel 12 having spaced therefrom and mounted in front thereof a pressure differential gage 14, which, as shown, is in the form of a manometer tube laterally supported at its upper end by an eyelet or bracket 15 secured to the panel. Mounted behind the front panel 12 and adapted to be seen through an aperture 16 thereof is one of a plurality of graduated scales 18 adapted to be used in conjunction with the manometer tube to measure pressure differentials. A crank 20 mounted upon a shaft 22 is partly supported by the panel 12, and is adapted upon rotation, by means later to be described, to move one graduated scale 18 out of and another into register with the aperture 16.

Figure 3:
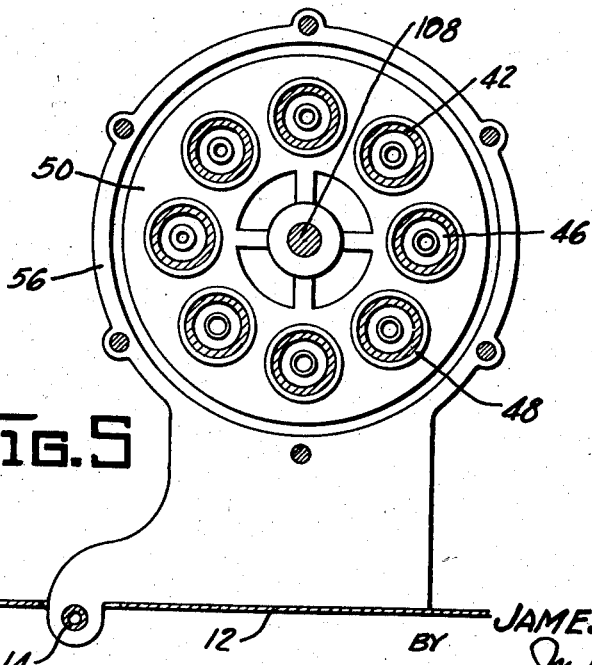
Figure 3 is a view in section taken substantially along the line 3—3 of Figure 2.

Means are provided for supplying liquid to the flow meter at a constant head. As shown in Figure 3, the means comprises a constant level reservoir 24 which is connected to a source of liquid by a coupling 26. Mounted in the coupling 26 is a needle valve 28 which is regulated in position by a float 30 secured to a bell crank 32, pivoted at 34, and having an arm 36 impinging against the valve member 28. It is obvious to those skilled in the art that the assembly just described maintains the liquid in the reservoir 24 at a constant level indicated by the broken line L—L.

Communicating with the reservoir 24 through a short passage 38 is a tubular casing 40 which has coaxially supported therein a vertically movable standpipe 42 having a number of perforations or apertures 44 therein, whereby the interior is constantly filled with liquid to the level L—L maintained by the constant level reservoir 24. The lower end of the standpipe 42 is adapted to cooperate with one of a plurality of orifice members 46 and one of a plurality of bushings 48, shown also in Figure 5, which are held in a circular plate 50 mounted for rotation upon bearings 52. A cylindrical spring 54 is provided with each orifice member and bushing assembly 46, 48 which tends to elongate upon disengagement of the standpipe 42 to urge the orifice 46 upwardly into the position shown by the left hand assemblies 46, 48, 54. It is to be understood that when the orifice 46 is in its upper position as shown by the left hand assembly 48 and 54 in Figure 3, the spring 54 is extended to its free limit of movement, so that said orifice 46 is thus supported in spaced relation relative to the bottom of the housing 56.

The circular plate 50 is contained within a housing 56 having secured therein an element 58 which supports a sealing member 60 made of rubber or similar elastic material. The housing 56 is drilled as shown to provide a passage 62 which may be connected to a charge forming device, not shown, and to provide a passage 64 which is connected by a conduit 66 to the manometer tube 14.

For forcing the selected orifice member 46 into firm engagement with the seat 60, the standpipe 42 is provided with a weight 68 secured to the top of the standpipe 42. This arrangement insures that there will be no leakage around the seat 60, and insures that the fluid supplied by the reservoir 24 must pass through the orifice member 46.

In order to change from the orifice used in the arrangement shown in Figure 3 to another of the orifices shown in Figure 5, means are provided to lift the standpipe 42 from engagement with the orifice member 46, whereupon the spring 54 may urge the orifice 46 upward out of engagement with seal 60, and to then rotate the plate 50 to bring another orifice into registry with the standpipe 42. As shown in Figure 4, the crank 20, which is mounted upon the shaft 22, is provided with a bushing 69 slidable on the shaft 22 and which is adapted to move longitudinally on said shaft with the crank 20 to permit rotation thereof by removing from engagement with a recess 70 a pin 72 which is supported by the crank 20 in the manner shown, there being a slot and pin connection between the bushing 69 and shaft 22. Such longitudinal movement of the crank 20 and bushing 69 is utilized to lift the standpipe 42 out of engagement with the orifice member 46. For this purpose there is provided, as best shown in Figures 4 and 6, a bell crank member 74 pivoted at 76, and having an arm 78 adapted to be rotated in a counterclockwise direction by movement of the bushing 69 axially with the movement of the pin 72 from the recess 70. An arm 80 of the bell crank 74 is connected to a link 82 secured at its other end to a lever of the first class 84 pivoted at 86, the arrangement being such that the counterclockwise movement of the bell crank lever 74 moves the weight 68 upwardly, at the same time lifting the stand-pipe 42 out of engagement with the orifice member 46 and permitting spring 54 to raise the orifice 46 away from the sealing member 60. Thus it will be seen that longitudinal movement of the crank 20, preparatory to selecting an orifice of different diameter, automatically frees the plate 50 for rotation.

Figure 2:
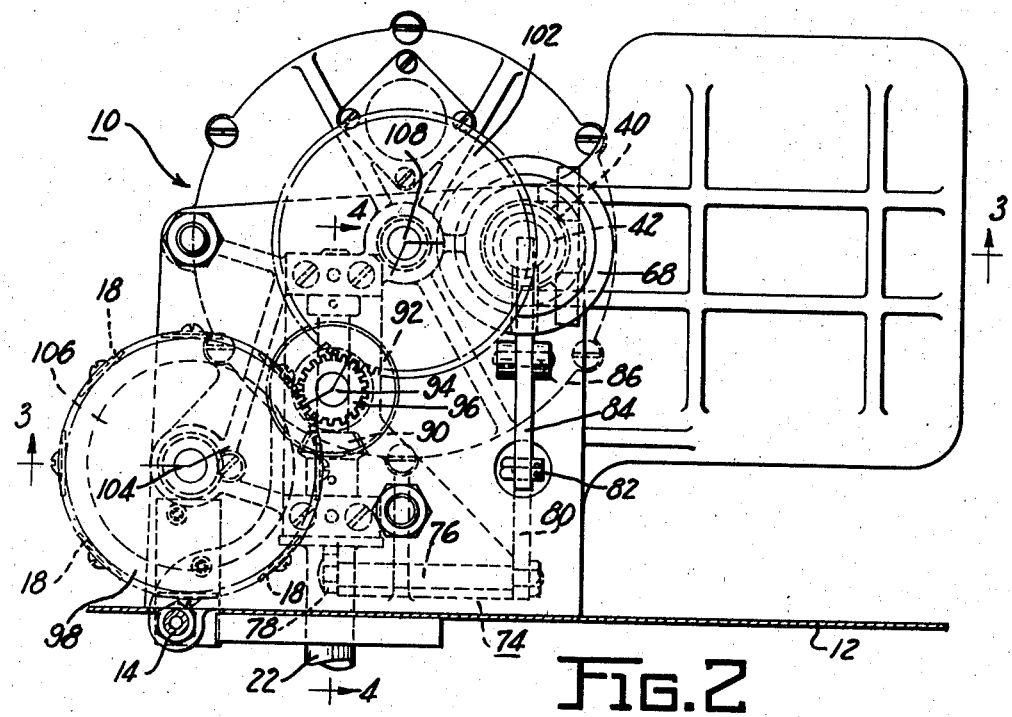
Figure 2 is a plan view of the flow meter shown in Figure 1.

Rotation of the crank 20 will impart rotation to a bevel gear 90 mounted upon the shaft 22, and cooperating with a matching bevel gear 92 secured to a shaft 94. Referring back to Figure 3, and referring also to Figure 6, the shaft 94 has mounted at the other extremity thereof a gear 96 which cooperates with a gear 98 and a second gear 102. Gear 98 is secured to a shaft 104 which has mounted thereon a drum 106 which supports a plurality of graduated scales 18, as shown in Figures 1, 2, and 3. Secured to gear 102 is a shaft 108 which has mounted at the lower end thereof the circular plate 50. Surrounding the shaft 108 is a casing 110 which is adapted to retain the liquid supplied by the reservoir 24 to the housing 56. During normal operation the housing 56, casings 40 and 110, and standpipe 42 are all filled with liquid to the level L—L, this level being maintained by the operation of float 30.

It may be noted that the gearing arrangement shown is such that a full revolution of the crank 20 will move the next succeeding orifice 46 into registry with the standpipe 42 and seal 60, and simultaneously will rotate the drum 106 whereby the graduated scale 18 corresponding to the newly selected orifice will appear in the aperture 16 (shown in Figure 1). Each of the graduated scales may bear an appropriate symbol to indicate to the operator which orifice member 46 is then being used to measure the flow of liquid. Aligning the pin 72 with the recess 70 insures that the newly selected orifice is in proper alignment with the standpipe 42 and seal 60. Moving the handle inwardly as shown in Figure 1 or upwardly as shown in Figure 4 to reinsert the pin 72 in the recess 70 releases the weight 68 and standpipe 42 whereby the newly selected orifice is brought into sealing contact with the seal 60. The operation of the device is as follows:

Liquid, for example, fuel for a charge forming device under test, is supplied at the coupling 26 where it is admitted into the reservoir 24, to be maintained at a constant level by the float and needle valve mechanism 30, 28 shown in Figure 3. The level thus maintained by the float 30 is maintained also within the casing 40 and within the standpipe 42, and exists as a column of liquid maintaining a constant head on the orifice member 46. As the liquid flows through the orifice member 46 a pressure drop will obtain, which is measured by means of the manometer tube 14 connected by means of the conduit 66 to the passage 64 located in the housing 56. The graduated scale 18 located immediately adjacent the manometer tube 14 may be so arranged that the pressure drop across the orifice 46 is measured, or preferably the scale is calibrated to indicate directly the quantity of fluid flowing past the orifice member 46. When the conditions of flow of fluid to the device to be tested changes whereby the orifice then being used is no longer efficient for accurate measurement of the flow, the operator can change to another size orifice which will give the accuracy and efficiency desired. To perform this operation the operator merely pulls the crank 20 outwardly away from the panel 12, thereby releasing the pin 72 from engagement with the recess 70, and rotates the crank 20 through one or more revolutions to select the desired orifice and place in view the desired calibrated scale 18 for efficient and accurate measurement of flow under the particular conditions had. Pulling the crank 20 lifts the weight 68 and the standpipe 42 whereby engagement is no longer had with the orifice member 46, thereby permitting free rotative movement of the plate 50 to the position whereby the desired orifice is brought into alignment with the standpipe 42. Moving the crank inwardly axially whereby the pin 72 is now once more in engagement with the recess 70, insures that the desired orifice member 46 is in proper position and that the standpipe will be brought into engagement therewith whereby the orifice member is once more in firm engagement with the seat 60. The operation thus described may be changed at the will of the operator for any set of conditions which are desired to be measured.

As shown in Figure 1, the aperture 16 and the scales 18 do not extend upwardly to the fuel level L—L, but terminate at a point therebelow. This prevents use of a particular orifice through the low differential pressure range at which the accuracy of measurement is poor, and forces the operator to select the next smaller orifice which will produce a larger and more accurately measurable pressure differential. The aperture and scales are thus limited to the recommended usable range for each orifice, the orifice sizes being so selected that a slight overlap in the recommended range of values or rates of flow is provided for the succeeding orifices.

Thus has been described a simple and compact arrangement for measuring the flow of liquid supplied, for example, to a charge forming device. It will be readily apparent that the described device is equally applicable for measuring the flow of any liquid, and that the multiple metering element arrangement is readily adaptable for use in differential pressure type flow meters for measuring the flow of any fluid. While the invention has been described in terms of a desirable and preferred embodiment thereof, the scope of the invention is to be limited only in terms of the claims which are hereto appended.

I claim:

1. A device of the class described for measuring the flow of charge liquid comprising a reservoir containing liquid at a controlled level, a casing in communication with said reservoir and adapted to hold liquid at the same level as that in the reservoir, a standpipe within said casing having openings therein for communication with said liquid and adapted to move longitudinally on its axis, a plate having a plurality of different area orifices thereon adapted to be engaged by said standpipe and through which said liquid may flow, means comprising a plurality of gages each adapted to be used with a particular size orifice for measuring the flow through said orifice, and means for selecting a particular orifice with its gage, said means being adapted to move said standpipe out of engagement with said orifices while shifting from one orifice to another.

2. A device of the class described for measuring the characteristics of a charge forming device or the like comprising a reservoir containing liquid at a controlled level, a casing in communication with said reservoir and adapted to hold liquid at the same level as that in the reservoir, a standpipe within said casing having openings therein for communication with said liquid and adapted to move longitudinally on its axis, a plate having a plurality of orifice members of different areas mounted thereon, said orifice members being movable in a direction parallel to the axis of rotation of said plate, and being adapted to be engaged by said standpipe and through which said liquid may flow, a housing having a seat therein upon which said orifice members are adapted to seat, means comprising a plurality of gages each adapted to be used with a particular size orifice for measuring flow therethrough, and means for selecting a particular orifice with its gage, said last named means including means for moving said standpipe out of engagement with said orifice while shifting from one orifice to another.

3. The invention as defined in claim 2 wherein the operation of the selecting means causes the orifice member to be moved out of engagement with said seat.

4. A device of the class described for measuring the characteristics of a charge forming device or the like comprising a reservoir containing liquid at a controlled level, a casing in communication with said reservoir and adapted to hold liquid at the same level as that in the reservoir, a standpipe within said casing having openings therein for communication with said liquid and adapted to move longitudinally on its axis, a plate having a plurality of different area orifice members therein adapted to be engaged by said standpipe and through which said liquid may flow, a housing having a seat therein upon which said orifice members are adapted to seat, means comprising a plurality of gages each adapted to be used with a particular size orifice for measuring flow therethrough, and means for selecting a particular orifice with its gage, said means including a system of levers for moving said standpipe out of engagement with said orifice member selected.

5. The invention as defined in claim 4 wherein the operation of the selecting means causes the orifice member to be moved out of engagement with said seat.

6. The invention as defined in claim 2 wherein the selecting means comprises a gear train for moving the plate and the gages synchronously and includes means for indicating to an operator which orifice member in the plate has been selected.

7. The invention as defined in claim 4 wherein the selecting means comprises a gear train for moving the plate and the gages synchronously and includes means for indicating to an operator which orifice member has been selected.

8. An instrument for measuring the rate of flow of a liquid comprising a casing, an outlet passage leading from the casing, a rotatable plate within the casing, a plurality of orifice members of different effective areas mounted on the plate at equal distances from the axis of rotation and adapted to be brought successively into registry with the outlet upon rotation of the plate, a weighted member for moving a registered orifice member into fluid tight relation with the outlet passage whereby the passage receives only liquid flowing through the orifice, a vertical tube in communication with the outlet passage, a plurality of scales calibrated for the respective orifice members and rotatable into a position adjacent said tube, and means for simultaneously rotating said plate and said scales to thereby select an orifice member and its corresponding scale.

9. The invention defined in claim 8 wherein said last named means includes a member for raising and releasing the weighted member.

10. An instrument for measuring the rate of flow of a fluid comprising a casing, an outlet from the casing, a rotatable member within the casing, a plurality of metering elements arranged at equal distances from the axis of rotation of the member and adapted to be brought successively into registry with the outlet upon equal increments of rotation of said member, means including springs supported by the member for yieldably supporting the respective metering elements, means including a weight for moving the registered element relative to the rotatable member into registered relation with the outlet, means for supplying fluid at a substantially constant pressure to the inlet of the registered metering element, means indicating a pressure of the fluid posterior to the registered metering element, and means for raising the weight, rotating the member one or more increments and releasing the weight.

11. In a flow meter having a passage for fluid flow, a rotatable member having a plurality of apertures adapted to be brought successively into registry with said passage upon rotation of the member, yieldable means supported within each of said apertures, calibrated metering elements slidably mounted in the apertures and supported by the respective yielding means, a sealing ring of resilient material in the passage adjacent the member, means for displacing, relative to the rotatable member, an element registered with said passage to thereby bring it into sealing contact with the sealing ring, a gage for each metering element adapted to measure the flow therethrough, and means for bringing the respective gages into operation as the elements are brought into registry with the passage and moved into sealing contact with said sealing ring.

12. In a flow meter, means for supplying fluid at a constant head, a plurality of axially movable flow restricting means of different areas through which fluid may flow and which are adapted to cooperate with the first mentioned means, means adapted to be used with each flow restricting means for measuring the flow through said restricting means, there being measuring means for each of the flow restricting means, and an operator means for selecting a particular flow restricting means with its measuring means, said operator means also effecting relative longitudinal movement of the first and second mentioned means for bringing same into operative engagement with each other.

13. A multirange meter of the class described for measuring the characteristics of a charge forming device or the like comprising a longitudinally movable standpipe for supplying liquid at a constant head, a plurality of orifices of different areas through which said liquid may flow, a movable orifice supporting means adjacent one end of the standpipe, means for moving respective orifices into alignment with the standpipe, means for moving the standpipe axially into cooperative engagement with an aligned orifice, a plurality of gages each adapted to be used with a particular sized orifice for measuring the flow through one of said orifices, and means actuated upon bringing an orifice into alignment with the standpipe for bringing into operative relation its corresponding gage.

JAMES C. KEYWORTH.

REFERENCES CITED

The following references are of record in the file of this patent:

UNITED STATES PATENTS

| Number | Name | Date |
|---|---|---|
| 1,281,242 | Ball | Oct. 8, 1918 |
| 1,347,143 | Brown | July 20, 1920 |
| 1,621,876 | Doerr | Mar. 22, 1927 |
| 1,633,161 | Cavenagh | June 21, 1927 |
| 2,035,371 | Johnson et al. | Mar. 24, 1936 |
| 2,048,445 | Green | July 21, 1936 |
| 2,219,504 | Willis | Oct. 29, 1940 |
| 2,293,725 | Fiock et al. | Aug. 25, 1942 |

FOREIGN PATENTS

| Number | Country | Date |
|---|---|---|
| 120,671 | Great Britain | Nov. 21, 1918 |
| 297,918 | Germany | Mar. 26, 1921 |
| 558,087 | Germany | Sept. 1, 1932 |
| 811,894 | France | Jan. 23, 1937 |